US012735992B2

(12) United States Patent
Hoyt et al.

(10) Patent No.: US 12,735,992 B2
(45) Date of Patent: Sep. 15, 2026

(54) VARIABLE VANE LEVER ARM

(71) Applicant: RTX Corporation, Farmington, CT (US)

(72) Inventors: Samuel B. Hoyt, Farmington, CT (US); Fadi Samir Maalouf, East Hampton, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/041,812

(22) Filed: Jan. 30, 2025

(65) Prior Publication Data

US 2026/0218622 A1 Jul. 30, 2026

(51) Int. Cl.
*F01D 17/14* (2006.01)
*F01D 17/16* (2006.01)

(52) U.S. Cl.
CPC ........... *F01D 17/14* (2013.01); *F01D 17/162* (2013.01); *F05D 2240/12* (2013.01)

(58) Field of Classification Search
CPC ........ F01D 17/14; F01D 17/148; F01D 17/16; F01D 17/162; F05D 2240/12
See application file for complete search history.

(56) References Cited

U.S. PATENT DOCUMENTS 4,668,165 A 5/1987 Ludwick
6,019,574 A * 2/2000 DiBella ................. F04D 29/563 415/148
6,209,198 B1 * 4/2001 Lammas ............... F01D 17/162 29/889.22
7,011,494 B2 * 3/2006 Kies ...................... F04D 29/563 415/149.1
7,198,461 B2 4/2007 Burgmeier et al.
7,223,066 B2 * 5/2007 Rockley .............. F04D 27/0246 415/209.3
8,215,902 B2 * 7/2012 Major ................... F01D 17/162 29/889.22
9,228,438 B2 * 1/2016 Dube ...................... F01D 5/147
10,161,260 B2 * 12/2018 Morganti .................. F02C 7/36
10,393,145 B2 8/2019 Medina Cruz et al.
11,255,217 B2 * 2/2022 Landry ................. F01D 17/162
11,391,174 B2 * 7/2022 Little ...................... F01D 9/042
2014/0219785 A1 * 8/2014 Gasmen ................ F04D 29/563 29/889
2016/0032759 A1 * 2/2016 Gasmen ................ F01D 17/162 409/131

(Continued)

FOREIGN PATENT DOCUMENTS

FR 2877059 A1 4/2006

OTHER PUBLICATIONS

Office Action dated Jul. 24, 2025 for U.S. Appl. No. 19/041,827.

*Primary Examiner* — Brian P Wolcott
(74) *Attorney, Agent, or Firm* — Bachman & LaPointe, P.C.

(57) ABSTRACT

A vane arm has: a first end and a second end. A shank extends between the first end and the second end and has a first face and a second face. A first hole is in the shank proximate the first end and a second hole is in the shank proximate the second end. A tab projects distally from the shank proximate the second end and has: a bend; and a distal portion distally of the bend and projecting back toward the first end and less than fully overlapping the second hole, if at all.

16 Claims, 7 Drawing Sheets

(56) References Cited

U.S. PATENT DOCUMENTS

| | | | | |
|---|---|---|---|---|
| 2018/0163560 | A1 | 6/2018 | Mairhanser | |
| 2019/0112940 | A1 * | 4/2019 | Pratt | F02C 9/20 |
| 2021/0079805 | A1 | 3/2021 | Landry | |
| 2022/0341342 | A1 | 10/2022 | Nauss et al. | |

* cited by examiner

VARIABLE VANE LEVER ARM

BACKGROUND

The disclosure relates to variable lever arms. More particularly, the disclosure relates to vane lever arms such as used for variable vanes of a gas turbine engine.

Gas turbine engines (used in propulsion and power applications and broadly inclusive of turbojets, turboprops, turbofans, turboshafts, industrial gas turbines, and the like) may include variable vane stages in one or more sections of the engine. In a variable vane stage, a circumferential array of vane airfoils are each rotatable about the respective associated axis of rotation. The vane airfoils may each be mounted for such a rotation to an inner diameter (ID) platform/shroud or inner casing and an outer diameter (OD) shroud or outer casing. Vane rotation may be driven by respective lever arms typically mounted to an outer diameter (OD) shaft of the vane.

Example vane lever arms extend between a driving end and a driven end. The driving end includes one or more features for mounting to a driver such as a synchronizing ring. The driven end includes one or more features for mounting to the associated vane OD shaft/stem to rotate said vane about its axis of rotation.

A number of constructions of vane arms exist. U.S. Pat. No. 10,161,260B2 (the '260 patent) of Morganti et al., Dec. 25, 2018, entitled "Vane Lever Arm for a Variable Area Vane Arrangement", discloses vane arms formed via bending sheet metal stock. The disclosure of the '260 patent is incorporated by reference in its entirety herein as if set forth at length. The vane may be formed by bending a cut generally T-shaped piece of the sheet stock. The driving end is formed at the end of the leg of the T and has a hole/aperture for accommodating a drive pin engaged by the synchronizing ring. The driven end is formed near the head or intersection of the leg and the arms of the T. Near the head/intersection, the leg has a hole/aperture for receiving a threaded shaft/stem of the vane.

The arms are bent around to overlap. The overlapping one of the arms has an aperture through which the vane shaft/stem passes in the mounted condition. The overlapped arm end protrudes over the overlapping arm aperture. A proximal portion of the vane shaft/stem is clamped by abutting contact of both a proximal edge of the overlapping arm aperture and the overlapped arm distal end.

To install the vane arm of the '260 patent to its associated vane, a tool is used to spread the arms slightly apart to reduce the overlap of the overlapped arm distal end and the overlapping arm aperture. The spreading provides clearance to install with the overlapping arm aperture passing over the threaded distal end portion of the shaft and over a region proximal of the threads having opposite parallel flats. Ultimately, the shaft passes through the head end aperture of the leg allowing a tab washer and nut to be installed and tightened down.

Releasing of the tool allows partial relaxation of the arms to compressively engage the shaft/stem proximal portion flats for registry. The head end hole in the '260 patent is partially circular with a circular arc and a chord providing a flat perimeter surface. In complementary fashion, the shaft threaded end portion has a flat interrupting the threads. The cooperation of the hole flat and shaft flat provides rotational keying to predetermine a single installation orientation of the vane arm relative to the vane. Although the non-circular cooperation of the hole and shaft/stem provides some rotational coupling, to withstand operational torques, additional rotational coupling is provided by the cooperation of the arms with the flats/facets of the shaft/stem.

SUMMARY

A further aspect of the disclosure involves a vane arm comprising: a first end and a second end. A shank extends between the first end and the second end and has a first face and a second face. A first hole is in the shank proximate the first end and a second hole is in the shank proximate the second end. A tab projects distally from the shank proximate the second end and has: a bend; and a distal portion distally of the bend projecting back toward the first end and less than fully overlapping the second hole, if at all.

A further embodiment of any of the foregoing embodiments may additionally or alternatively include a third hole closer to the second hole than to the first hole.

In a further embodiment of any of the foregoing embodiments, additionally and/or alternatively the first, second, and third holes are in a single metallic piece.

A further embodiment of any of the foregoing embodiments may additionally or alternatively include a fourth hole between the third hole and the first hole and having a length between the first and second holes at least three times a width transverse thereto.

In a further embodiment of any of the foregoing embodiments, additionally and/or alternatively, a vane assembly includes the vane arm and further comprises a vane having an airfoil and a shaft protruding from an end of the airfoil, wherein: the vane shaft extends through the second hole; the vane shaft has a side facet abutting an end of the tab distal portion; and a nut holds the vane arm to the shaft compressed between the nut and a shoulder of the vane shaft.

In a further embodiment of any of the foregoing embodiments, additionally and/or alternatively, a tab washer is between the nut and the vane arm and has a tab received in a third hole in the vane arm.

In a further embodiment of any of the foregoing embodiments, additionally and/or alternatively: the vane has a radially-extending surface at a proximal end of the facet.

A further embodiment of any of the foregoing embodiments may additionally or alternatively include a pin mounted in and protruding from the first hole.

In a further embodiment of any of the foregoing embodiments, additionally and/or alternatively, a vane stage comprises a plurality of said vane assemblies and further comprises: a synchronizing ring coupled to the vane arms and having an axis; and for each vane assembly one or more bearings mounting the vane for rotation about an axis of the vane wherein, rotation of the synchronizing ring about its axis rotates the vanes about their respective axes.

In a further embodiment of any of the foregoing embodiments, additionally and/or alternatively, a method for using the vane arm comprises: installing the arm to a vane so that: a shaft of the vane extending from an end of an airfoil of the vane passes through the second hole; and an end of the tab distal portion abuts a side facet of the vane shaft. The method further comprises installing a nut to a threaded portion of the shaft to hold the vane arm to the shaft.

A further embodiment of any of the foregoing embodiments may additionally or alternatively include: installing a pin to the first hole.

In a further embodiment of any of the foregoing embodiments, additionally and/or alternatively, the method is performed with a plurality of vane arms and the respective pins are mounted to a shared synchronizing ring.

A further aspect of the disclosure involves a vane arm comprising: a first end and a second end; a shank extending between the first end and the second end and having a first face and a second face; a first hole in the shank proximate the first end; a second hole in the shank proximate the second end; and an elongate third hole in the shank between the first hole and the second hole and spanning at least 40 percent of a distance between the first hole and the second hole or at least 25 percent of an overall length of the vane arm.

In a further embodiment of any of the foregoing embodiments, additionally and/or alternatively, the elongate third hole spans at least 30 percent of an overall length of the vane arm.

In a further embodiment of any of the foregoing embodiments, additionally and/or alternatively, the elongate third hole spans 30 percent to 45 percent of an overall length of the vane arm.

A further embodiment of any of the foregoing embodiments may additionally and/or alternatively include a fourth hole between the third hole and the second hole.

In a further embodiment of any of the foregoing embodiments, additionally and/or alternatively, the elongate third hole spans at least 30 percent of an overall length of the vane arm.

In a further embodiment of any of the foregoing embodiments, additionally and/or alternatively, the elongate third hole has a length between the first and second holes and a width transverse thereto being 10 percent to 30 percent of said length.

In a further embodiment of any of the foregoing embodiments, additionally and/or alternatively, the first and fourth holes are circular in footprint.

In a further embodiment of any of the foregoing embodiments, additionally and/or alternatively, a vane assembly includes the vane arm and further comprises a vane having an airfoil and a shaft protruding from an end of the airfoil, wherein: the vane shaft extends through the second hole; and a nut holds the vane arm to the shaft compressed between the nut and a shoulder of the vane.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
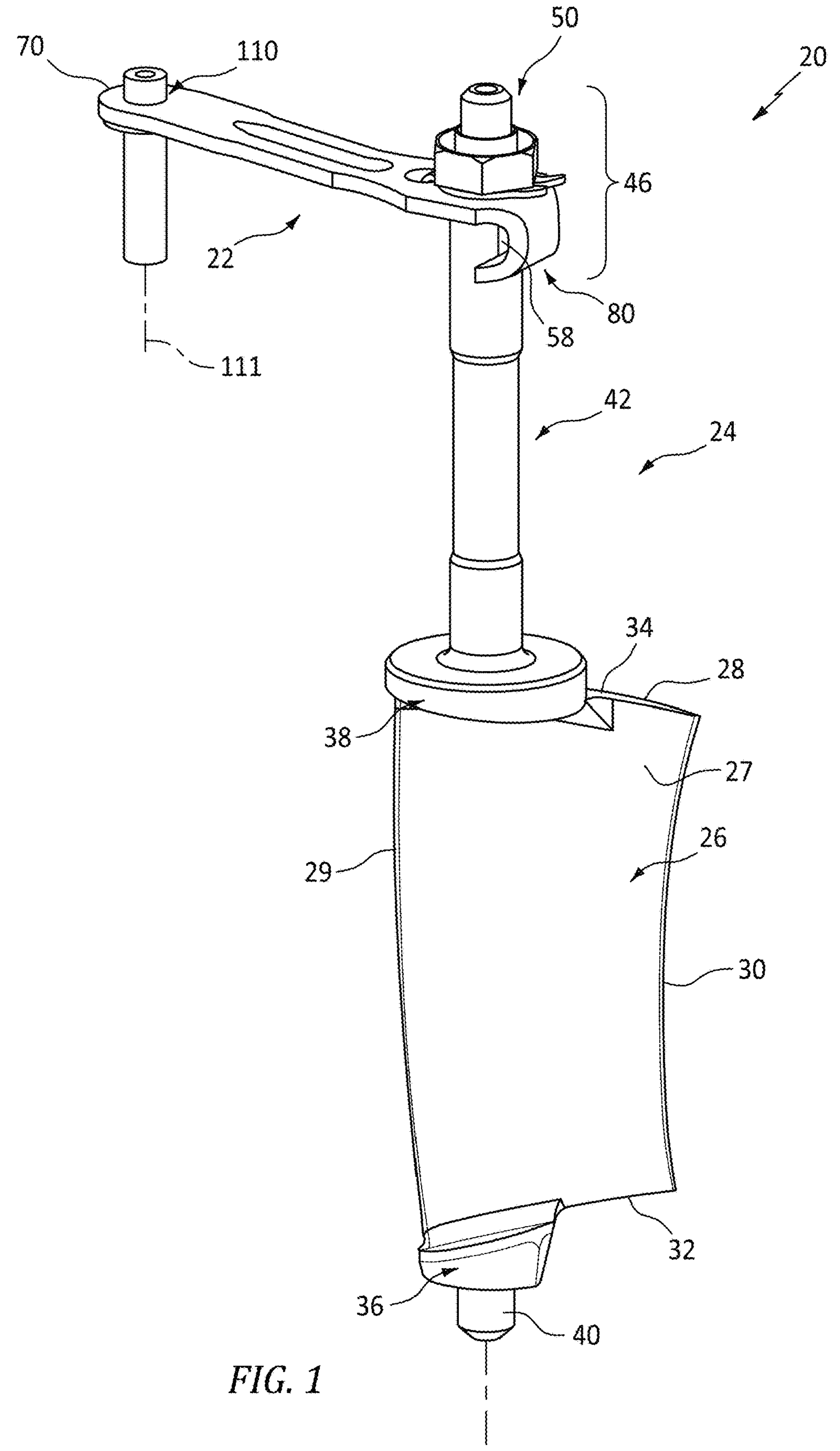
FIG. 1 is a view of a vane assembly.

FIG. 1 shows a vane assembly 20 including vane arm 22 and vane 24 configured as a modification of the baseline of the '260 patent. The vane 24 includes an airfoil 26 having a pressure side 27, a suction side 28, a leading edge 29, and a trailing edge 30. The airfoil extends along a span from an inner diameter (ID) end 32 to an outer diameter (OD) end 34. Such ID and OD are measured essentially relative to the engine centerline. The airfoil ID and OD ends respectively merge, along forward/leading portions thereof, with respective ID and OD platforms 36 and 38. Respectively inward and outward from the platforms 36 and 38 are an ID shaft 40 and an OD shaft 42. The shafts are coaxial along a vane axis 44 which forms an axis of rotation and axis of threads of a threaded portion 50 discussed below. The OD shaft 42 includes a distal mounting section 46 for mating with the vane arm 22. Relative to the '260 patent, the keying and rotational coupling provided by two lateral facets of the stem/shaft cooperating with two arms/branches of the vane arm is replaced by a single flat or facet 58 of the stem/shaft cooperating with a single longitudinally-projecting tab 80.

Figure 2:
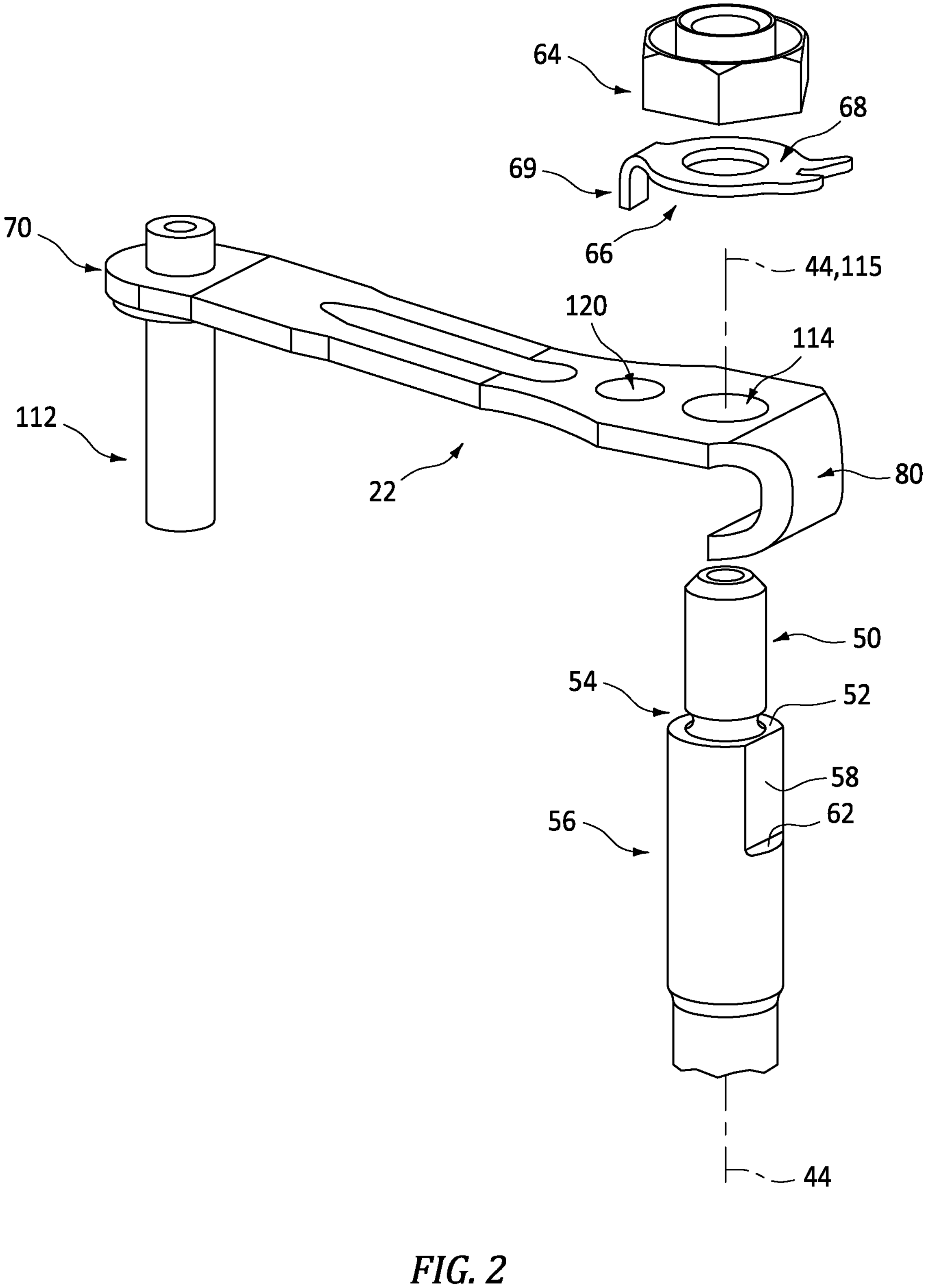
FIG. 2 is an enlarged partially exploded view of a vane actuating arm region of the assembly of FIG. 1.
Figure 3:
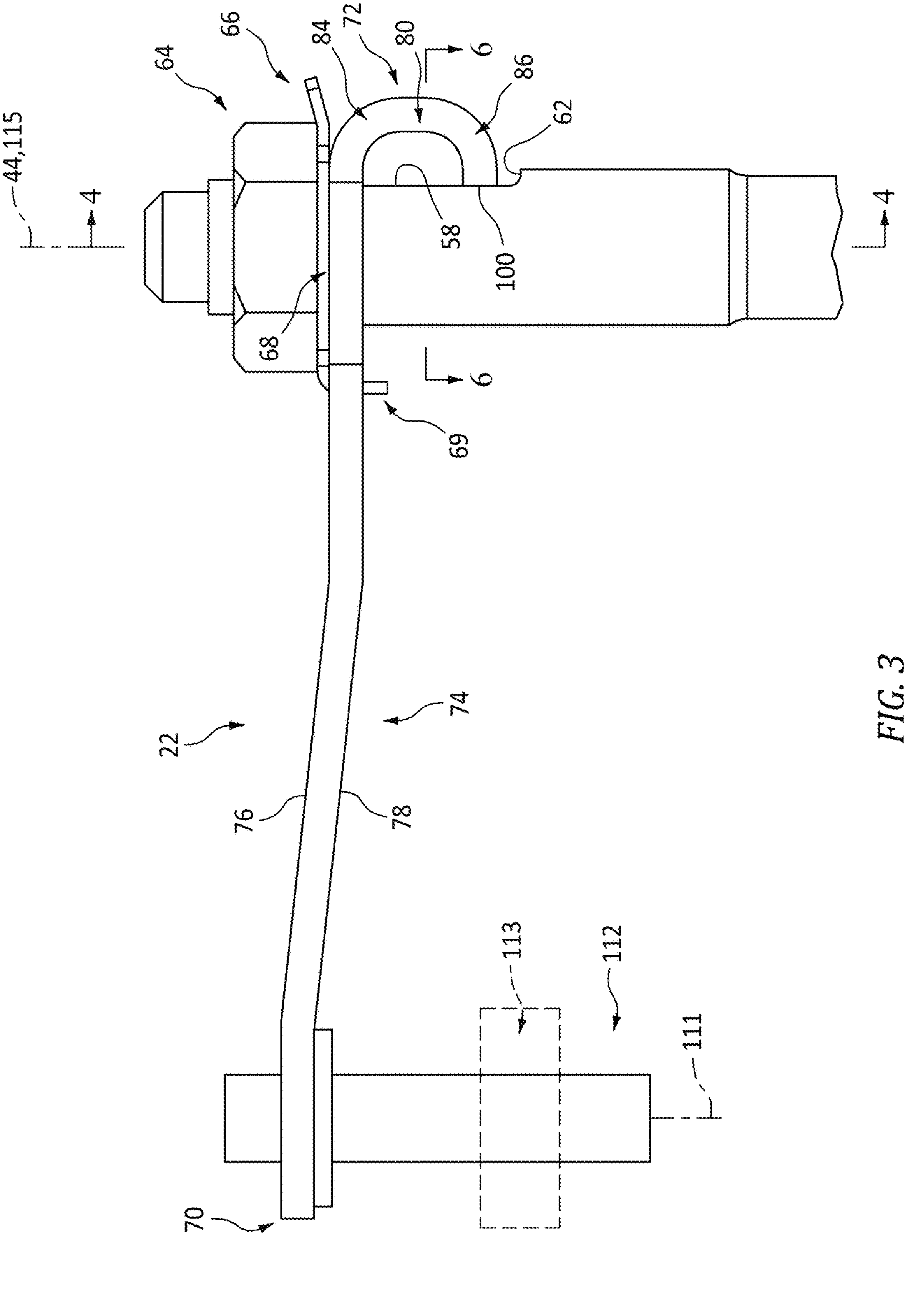
FIG. 3 is a side view of the vane arm region.
Figure 5:
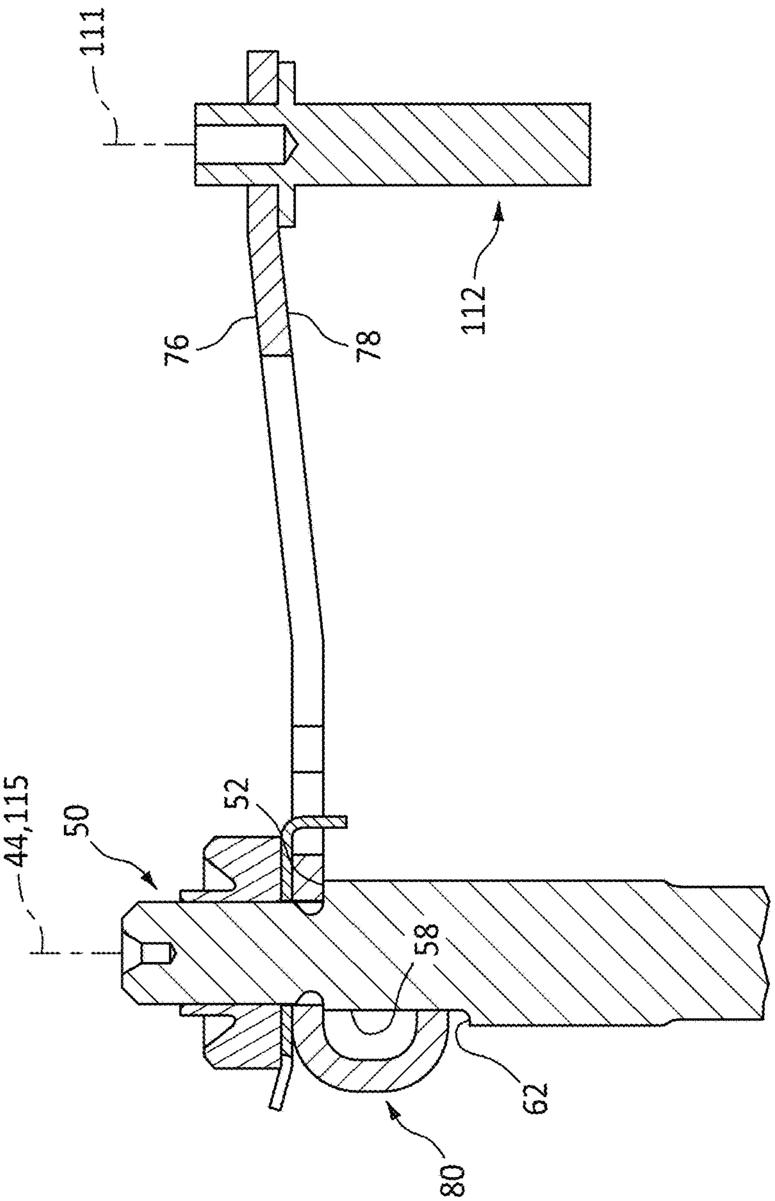
FIG. 5 is a sectional view of the vane arm region taken along line 5-5 of FIG. 4.
Figure 4:
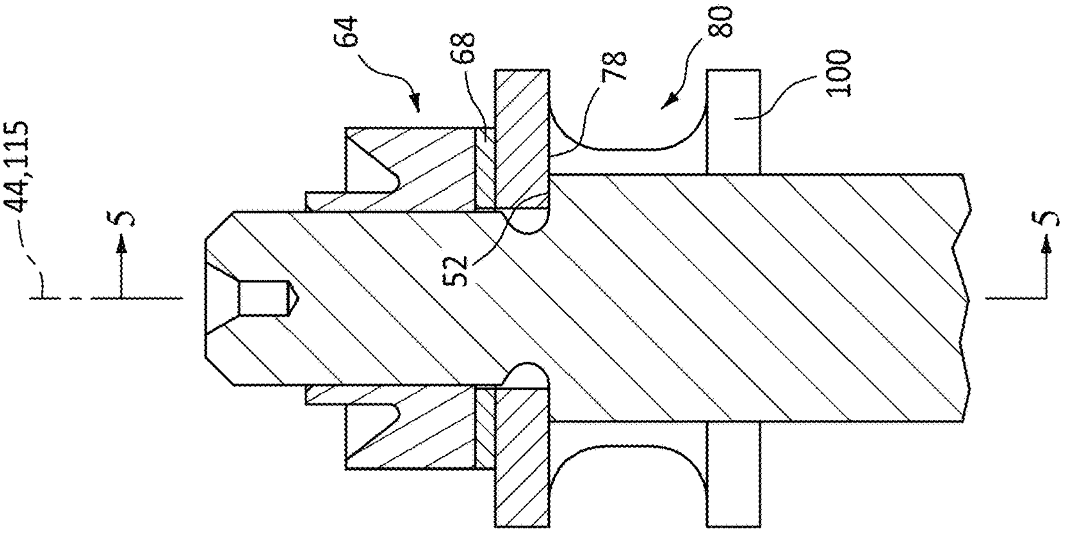
FIG. 4 is a sectional view of the vane arm region taken along line 4-4 of FIG. 2.
Figure 7:
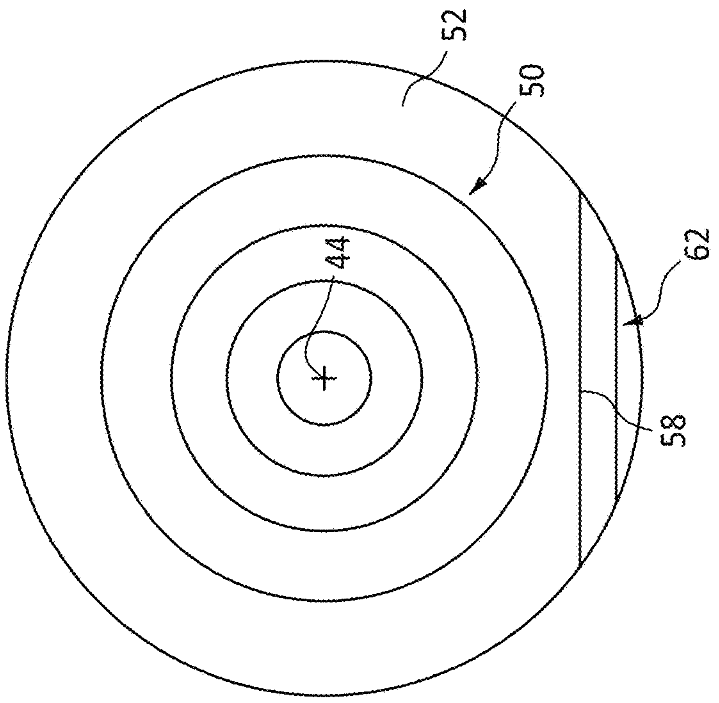
FIG. 7 is an outer diameter (OD) view of a distal end of an outer diameter (OD) shaft section of the vane of the assembly.
Figure 6:
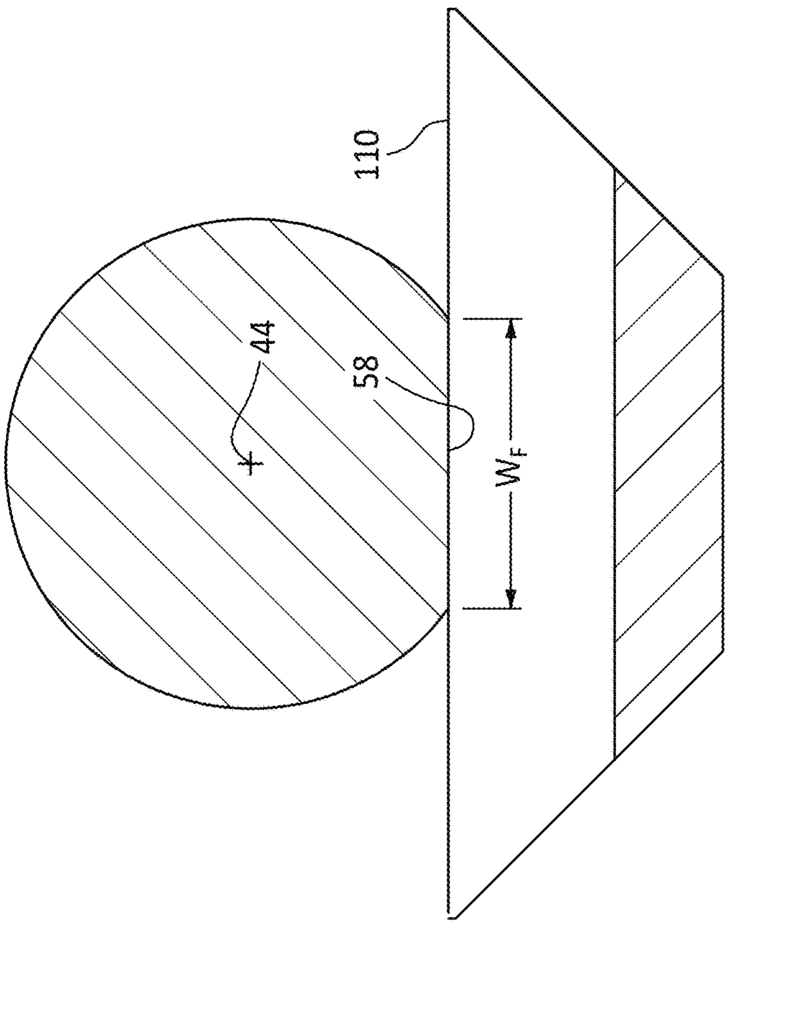
FIG. 6 is a sectional view of the vane arm region taken along line 6-6 of FIG. 3.

The mounting section 46 includes an externally threaded section/region/portion 50 (FIG. 2) with a shoulder surface 52 radially inward thereof or proximal relative to the airfoil. The shoulder 52 is separated from the threaded section by a necked region 54. Below/inward of the shoulder is a faceted section 56 having a single face or facet 58 circumferentially interrupting an otherwise right circular cylindrical surface. This facet extends along a substantial majority of its axial length parallel to the axis 44 with a fillet 62 to an intact circular section of the shaft. In section normal to the vane axis 44, the facet 58 forms a chord of a circle and has a width or chordlength $W_F$ (FIG. 6). FIG. 3 also shows a nut 64 installed to the threaded section and a tab washer 66 between the nut and the arm. The tab washer has an annular body 68 and a tab 69 bent at an angle thereto.

The arm 22 (FIG. 3) extends generally from a first end 70 to a second end 72. In this example, the first end 70 is a driving end and the second end 72 is a driven end. The example arm 22 is formed from stamped/bent sheet metal stock (e.g., nickel-based alloy/superalloy such as AMS 5596-UNS N07718 (nominal 52.5Ni-19Cr-3.0Mo-5.1Cb (Nb)-0.90Ti-0.50Al-18Fe)). The arm 22 has a shank 74 extending between the first end and the second end and having a first face 76 and a second face 78. These faces 76 and 78 may correspond to faces of the sheet stock or relieved portions thereof. In the example, a portion of the second face 78 may be relieved (not shown) relative to the original sheet stock for lightening. In an example method of manufacture, the stamped sheet stock piece may have an initial cut form of a generally straight strip planform/footprint vs. the T-like footprint of the pre-bending precursor to the vane arm of the '260 patent.

Figure 9:
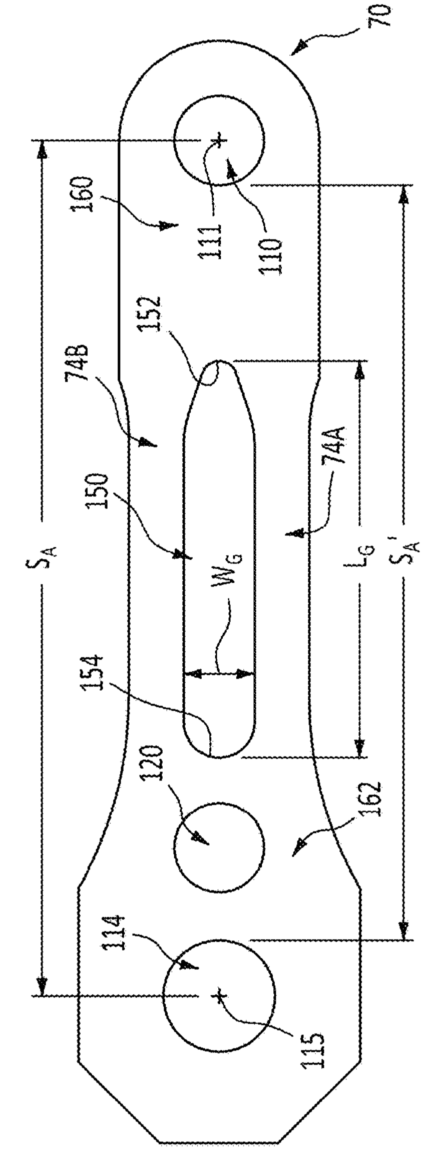
FIG. 9 is an OD face view of the vane arm.
Figure 10:
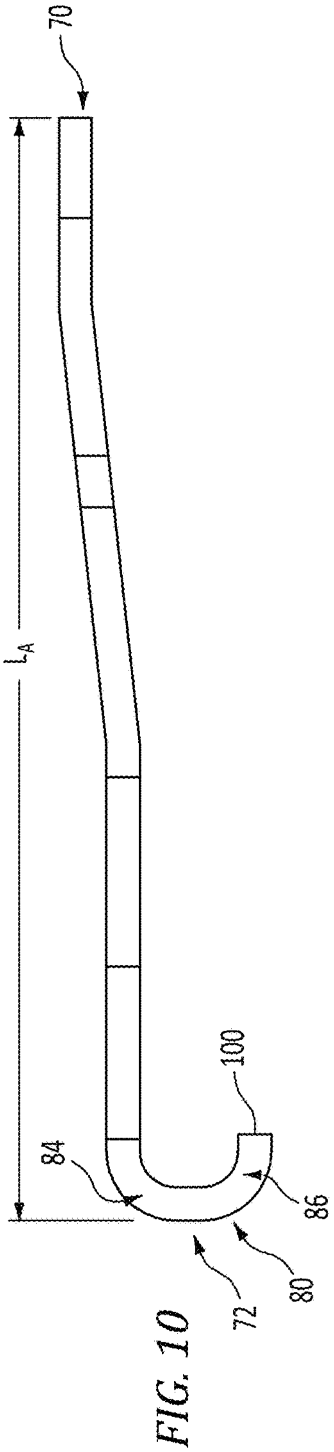
FIG. 10 is a side view of the vane arm.

One end of the strip may ultimately form the first end 70 of the arm. The other end of the strip may ultimately form a distal end 100 of bent tab 80 projecting from the shank 74 proximate the second end. FIG. 3 shows the tab 80 in its bent configuration with one or more bends 84, 86, extending from a second end portion 88 of the shank to a distal portion 90. The example bends have the effect of forming an essentially 180° U-turn. The tab extends to a distal end 100 which may represent the second end of the initial strip precursor. The bend may be more than 90° so that the distal portion may partially overlap (i.e., a line parallel to the axis 44 may have two sets of intersections with the arm through the distal portion spaced apart by a gap) and point back toward the first end (e.g., back toward the axis 44, 115 discussed below although not necessarily with the more than 180° turn to point exactly at the first end). The overlap is insufficient to fully overlap the hole 114 (discussed below). The example tab, however, does not overlap the hole 114 and thus the end 100 is not visible in FIG. 9. The example implementation has a proximal 90° bend 84 and a distal 90° bend 86 cooperating to form a 180° turn with a short straight length between. Alternative implementations may have a continuous 180° bend or may have a bend slightly off 180° with the face 100 correspondingly off perpendicular to the adjacent faces of the original strip.

Figure 8:
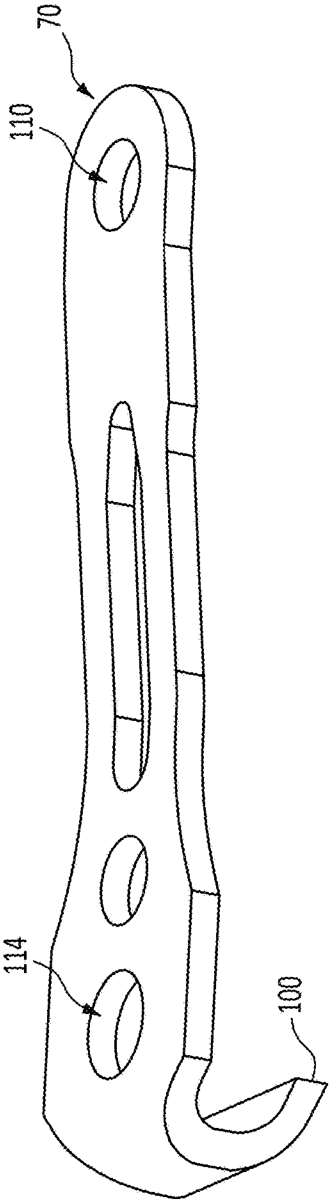
FIG. 8 is a view of a vane arm of the assembly.

The example vane arm has exactly four through-holes. A first through-hole 110 (FIGS. 8&9) is adjacent the first end 70 for receiving a driving pin 112 (FIGS. 1&2) which, in turn, is mounted to a synchronizing ring 113 (FIG. 3) in common with the pins of the other vanes of the stage and sharing a central longitudinal axis with the engine and the vane stage. A second through-hole 114 is near the second end and receives the OD shaft 42. The example second hole 114 is of circular cross-section dimensioned to just accommodate the threaded section 50 and allow the adjacent portion of the surface 78 to rest atop the shoulder surface 52. The hole 110 has an axis 111 shared with the pin 112. The second hole 114 has an axis 115 coaxial with the axis 44 in a mounted condition. An example hole-to hole on-center distance or separation $S_A$ (FIG. 9) is about 1.5 inch (38 mm), more broadly 25 mm to 51 mm or 37 mm to 43 mm. An example overall length LA is about 1.7 inch (43 mm), more broadly 30 mm to 80 mm or 35 mm to 60 mm.

A third hole 120 is formed near the second hole 114 but to the first end side thereof to receive the washer tab 69. The holes 110, 114, and 120 may be drilled holes.

The modification relative to the '260 patent shifts the keying function from the second end hole 114 of the leg of the T to the end 100 of the single bent tab cooperating with the flat/facet 58. If the arm is installed 180° misoriented about the axis 44, the tab face adjacent end 100 will come into contact with an intact portion of the shoulder 52 (when the circular perimeter is intact) to block the further translation.

Additionally, the tab 100 to shaft flat 58 cooperation will provide torque transmission.

With keying provided by the tab 80, the keying function may be removed from the threaded portion of the shaft and the head end hole. Thus, the head end hole 114 may be circular in footprint and the shaft threads may be uninterrupted by the flat of the '260 patent.

Relative to the baseline, such modification may offer one or more of several advantages. The head end hole 114 may be easier to form (e.g., drill) as a pure circle relative to the baseline hole having a flat. The step of grinding the baseline shaft flat (that keys with the baseline hole flat) may be eliminated as may be any thread dressing or touch up required by pre-forming or post-forming the shaft flat. Weight may be reduced, particularly with small holes 114 (also enabling potential reduction in hole and thread diameter and nut size.

A further feature is that the shank 74 of the arm is bifurcated (FIG. 9) by an elongate hole or slot 150 (having first and second ends 152 and 154, respectively) into two parallel arm segments 74A and 74B between terminal end regions of the vane arm (e.g., a first end region 160 containing the first hole 110 and a second end region 162 containing the second and third holes and tab). Example length $L_G$ of this hole or gap 150 is at least 25 percent or at least 30 percent of the overall length $L_A$ of the vane arm, more particularly, 30 percent to 50 percent or 30 percent to 45 percent or 35% to 40%. Such length $L_G$ may also be an example at least 40 percent of a hole 110 to hole 114 on center span $S_A$ or closest proximity span $S_A'$, more particularly 40 percent to 80 percent. Example slot width $W_G$ is about 20% of $L_G$, more broadly 10% to 30% or 15% to 30% or 15% to 25%. The bifurcation may provide a lightening and/or strengthening combination in various embodiments.

Figure 11:
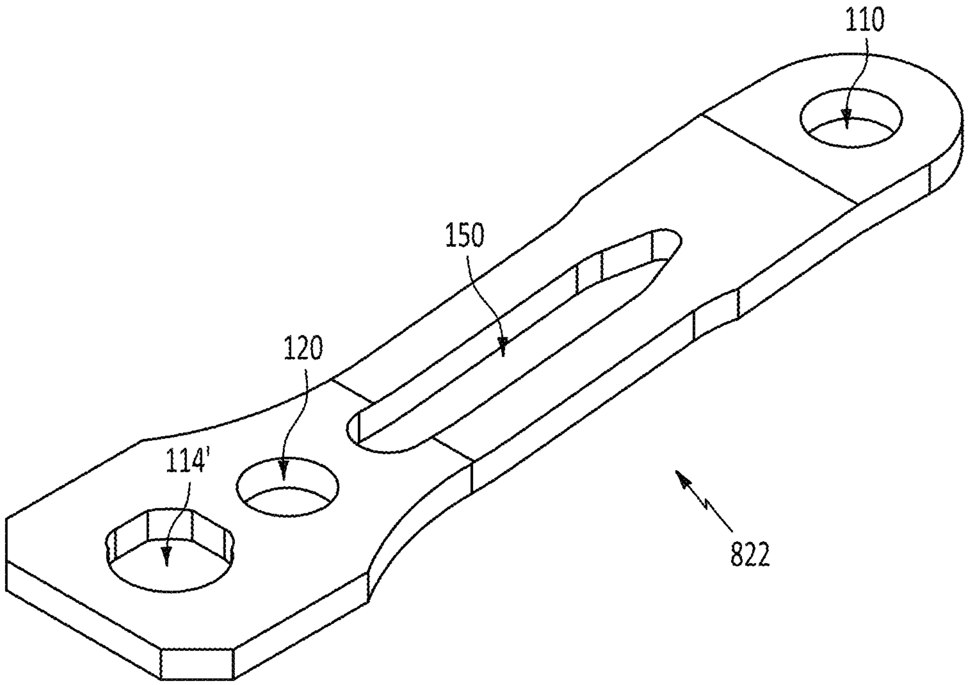
FIG. 11 is a view of a second arm of a second vane assembly.
Figure 12:
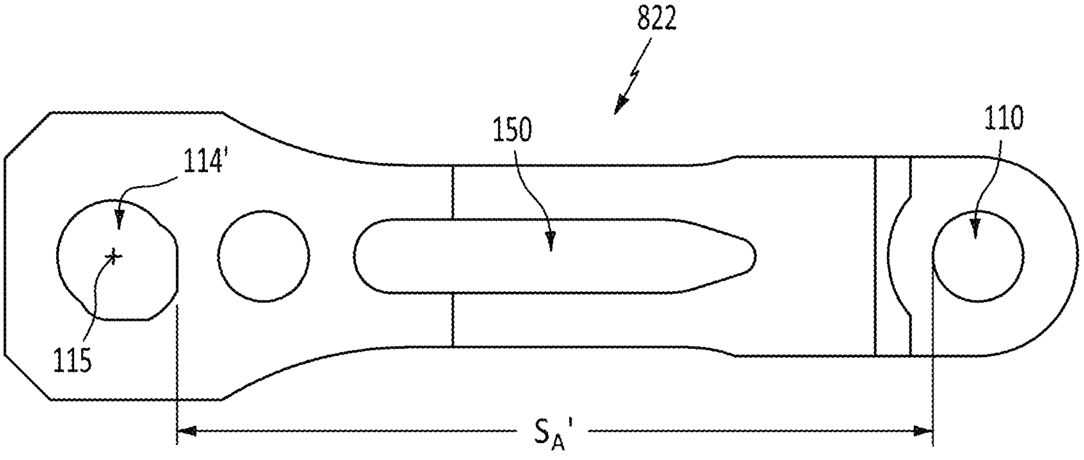
FIG. 12 is an inner diameter (ID) face view of the vane arm of FIG. 9.

This bifurcation may be applied to other vane arm configurations. FIGS. 11 and 12 show a simple tabless arm 822 wherein the second hole 114' is non-circular for cooperating with a complementary non-circular boss (not shown) protruding up from the vane shaft/stem shoulder at the base of the threaded section. In that particular example, the threaded section may be uninterrupted (e.g., lacking a keying flat because the boss provides the keying and protrudes radially beyond the thread apex(es)/outer diameter (OD)). In yet other embodiments, the bifurcation may be applied to vane arms that have keying flats to their vane shaft/stem-receiving hole.

Component materials and manufacture techniques and assembly techniques may be otherwise conventional. This may involve stamping/machining/press braking from plate stock. Circular holes may be drilled. The elongate slot may be formed by the initial stamping or by a machining operation such as a CNC end milling as may be other non-circular features.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline vane arm configuration, details of such baseline may influence details of particular implementations. Accordingly, other embodiments are within the scope of the following claims.

What is claimed is:

1. A vane arm comprising:

a first end and a second end;

a shank extending between the first end and the second end and having a first face and a second face;

a first hole in the shank proximate the first end;

a second hole in the shank proximate the second end; and a tab projecting distally from the shank proximate the second end and having:

a bend; and a distal portion distally of the bend projecting back toward the first end and less than fully overlapping the second hole, if at all.

2. The vane arm of claim 1 further comprising:

a third hole closer to the second hole than to the first hole.

3. The vane arm of claim 2 wherein:

the first, second, and third holes are in a single metallic piece.

4. The vane arm of claim 2 further comprising:

a fourth hole between the third hole and the first hole and having a length between the first and second holes at least three times a width transverse thereto.

5. A vane assembly including the vane arm of claim 1 and further comprising a vane having an airfoil and a shaft protruding from an end of the airfoil, wherein:

the vane shaft extends through the second hole;

the vane shaft has a side facet abutting an end of the tab distal portion; and a nut holds the vane arm to the shaft compressed between the nut and a shoulder of the vane shaft.

6. The vane assembly of claim 5 wherein:

a tab washer is between the nut and the vane arm and has a tab received in a third hole in the vane arm.

7. The vane assembly of claim 5 wherein:

the vane has a radially-extending surface at a proximal end of the facet.

8. The vane assembly of claim 5 further comprising:

a pin mounted in and protruding from the first hole.

9. A vane stage comprising a plurality of vane assemblies of claim 5 and further comprising:

a synchronizing ring coupled to each vane arm and having an axis; and for each vane assembly one or more bearings mounting the vane for rotation about an axis of the vane wherein, rotation of the synchronizing ring about its axis rotates each vane about its respective axis.

10. A method for using the vane arm of claim 1, the method comprising:

installing the arm to a vane so that:

a shaft of the vane extending from an end of an airfoil of the vane passes through the second hole; and an end of the tab distal portion abuts a side facet of the vane shaft; and installing a nut to a threaded portion of the shaft to hold the vane arm to the shaft.

11. The method of claim 10 further comprising:

installing a pin to the first hole.

12. The method of claim 11 wherein:

the method is performed with a plurality of vane arms and the respective pins are mounted to a shared synchronizing ring.

13. The vane arm of claim 4 further comprising:

the fourth hole spans at least 30 percent of an overall length of the vane arm.

14. The vane arm of claim 4 further comprising:

the fourth hole spans 30 percent to 45 percent of an overall length of the vane arm.

15. The vane arm of claim 4 further comprising:

the fourth hole width is 10 percent to 30 percent of said fourth hole length.

16. The vane arm of claim 4 wherein:

the first and third holes are circular in footprint.

* * * * *